(12) United States Patent
Gokmen et al.

(10) Patent No.: US 11,263,521 B2
(45) Date of Patent: Mar. 1, 2022

(54) VOLTAGE CONTROL OF LEARNING RATE FOR RPU DEVICES FOR DEEP NEURAL NETWORK TRAINING

(71) Applicant: International Business Machines Corporation, Armonk, NY (US)

(72) Inventors: Tayfun Gokmen, Briarcliff Manor, NY (US); Yurii A. Vlasov, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1005 days.

(21) Appl. No.: 15/251,278

(22) Filed: Aug. 30, 2016

(65) Prior Publication Data
US 2018/0060726 A1 Mar. 1, 2018

(51) Int. Cl.
*G06N 3/063* (2006.01)
*G06N 3/08* (2006.01)

(52) U.S. Cl.
CPC ........... *G06N 3/0635* (2013.01); *G06N 3/084* (2013.01)

(58) Field of Classification Search
CPC .............................. G06N 3/0635; G06N 3/084
See application file for complete search history.

(56) References Cited

U.S. PATENT DOCUMENTS

| 5,003,490 | A | 3/1991 | Castelaz et al. |
|---|---|---|---|
| 5,619,617 | A | 4/1997 | Furuta et al. |
| 5,706,403 | A | 1/1998 | Shibata et al. |
| 7,430,546 | B1 | 9/2008 | Suri |
| 9,111,222 | B2 | 8/2015 | Aparin |
| 2007/0176643 | A1* | 8/2007 | Nugent ................. H03K 19/02 326/104 |
| 2007/0233761 | A1* | 10/2007 | Mouttet .................. G06F 7/607 708/204 |
| 2011/0153533 | A1* | 6/2011 | Jackson ............... G06N 3/0635 706/17 |

(Continued)

FOREIGN PATENT DOCUMENTS

CN 101425152 A 5/2009

OTHER PUBLICATIONS

Shin, Sangho, Kyungmin Kim, and Sung-Mo Kang. "Resistive computing: Memristors-enabled signal multiplication." IEEE Transactions on Circuits and Systems I: Regular Papers 60, No. 5 (2013): 1241-1249. (Year: 2013).*

(Continued)

*Primary Examiner* — Alexey Shmatov
*Assistant Examiner* — Casey R. Garner
(74) *Attorney, Agent, or Firm* — Erik Johnson, Esq.; McGinn I.P. Law Group, PLLC.

(57) ABSTRACT

A device, system, product and method of controlling resistive processing units (RPUs), includes applying an input voltage signal to each node of an array of resistive processing units, and controlling a learning rate of the array of resistive processing units by varying an amplitude of the input voltage signal to the array of resistive processing units. A conductance state of the array of resistive processing units is varied according to the amplitude received at each of the resistive processing units of the array of resistive processing units. The controlling of the amplitude of input voltage signal is according to a processor of a control device.

19 Claims, 19 Drawing Sheets

(56) References Cited

U.S. PATENT DOCUMENTS

| | | | |
|---|---|---|---|
| 2015/0052093 | A1 | 2/2015 | Canoy et al. |
| 2015/0170025 | A1* | 6/2015 | Wu .................. G06N 3/0635 706/25 |
| 2016/0004959 | A1* | 1/2016 | Nugent ................ G06N 3/063 706/26 |
| 2016/0049195 | A1* | 2/2016 | Yu .................... G11C 13/0026 365/63 |
| 2016/0342904 | A1* | 11/2016 | Merkel ............... G06N 3/0635 |
| 2017/0017879 | A1* | 1/2017 | Kataeva .............. G06F 11/079 |
| 2017/0061278 | A1* | 3/2017 | Lee .................... G06N 3/0635 |
| 2017/0178725 | A1* | 6/2017 | Yang .................. G11C 13/003 |

OTHER PUBLICATIONS

Kataeva, Irina, Farnood Merrikh-Bayat, Elham Zamanidoost, and Dmitri Strukov. "Efficient training algorithms for neural networks based on memristive crossbar circuits." In 2015 International Joint Conference on Neural Networks (IJCNN), pp. 1-8. IEEE, 2015. (Year: 2015).*

Kadetotad, Deepak, Zihan Xu, Abinash Mohanty, Pai-Yu Chen, Binbin Lin, Jieping Ye, . . . and Jae-sun Seo. "Parallel architecture with resistive crosspoint array for dictionary learning acceleration.";IEEE Journal on Emerging and Selected Topics in Circuits and Sys; vol. 5, No. 2: p. 194-204. (Year: 2015).*

Kadetotad, Deepak, Zihan Xu, Abinash Mohanty, Pai-Yu Chen, Binbin Lin, Jieping Ye, . . . and Jae-sun Seo. "Neurophysics-inspired parallel architecture with resistive crosspoint array for dictionary learning.";2014 IEEE Biomedical Circuits and Sys Conf (BioCAS) Proceedings, pp. 536-539. IEEE (Year: 2014).*

Cauwenberghs, Gert. "An analog VLSI recurrent neural network learning a continuous-time trajectory." IEEE Transactions on Neural Networks7, No. 2 (1996): 346-361. (Year: 1996).*

Gokmen, Tayfun, and Yurii Vlasov. "Acceleration of deep neural network training with resistive cross-point devices: Design considerations." Frontiers in neuroscience 10 (Jul. 21, 2016): 333. (Year: 2016).*

Mel, et al. "The NIST Definition of Cloud Computing". Recommendations of the National Institute of Standards and Technology. Nov. 16, 2015.

* cited by examiner

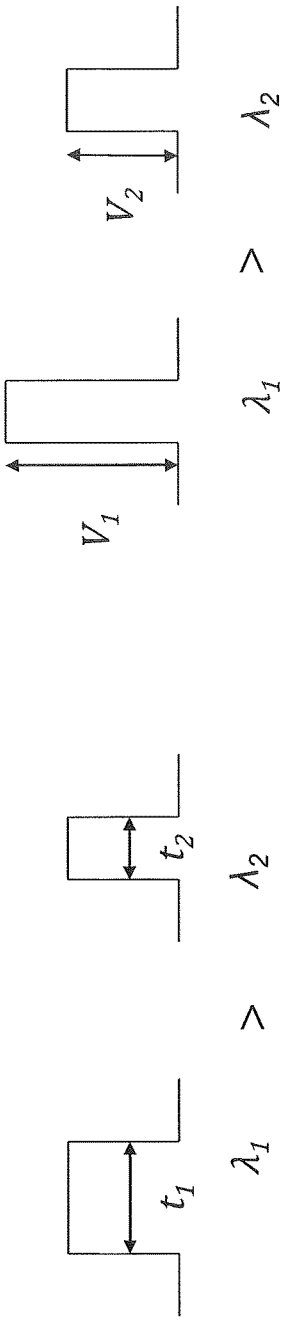

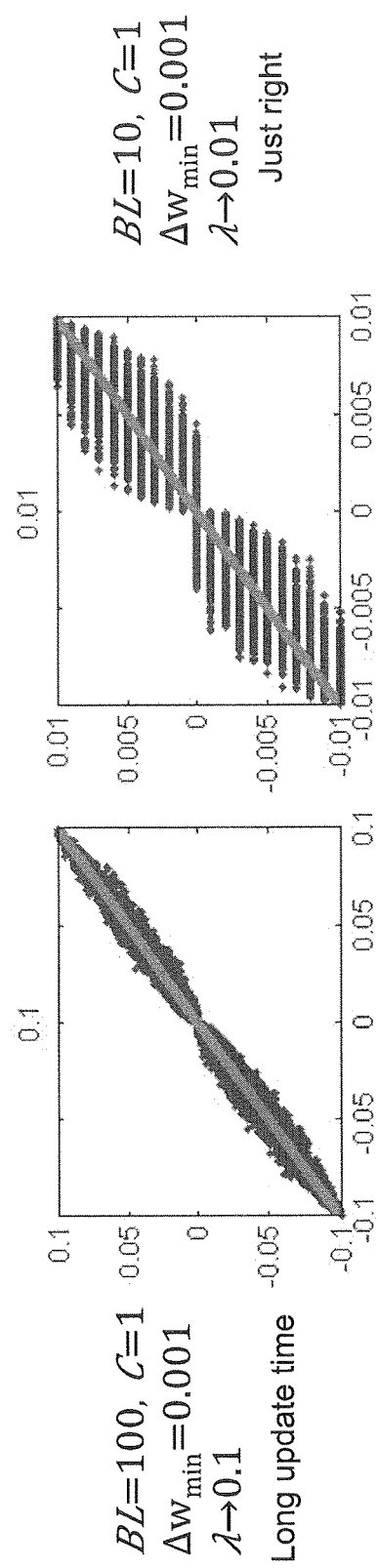
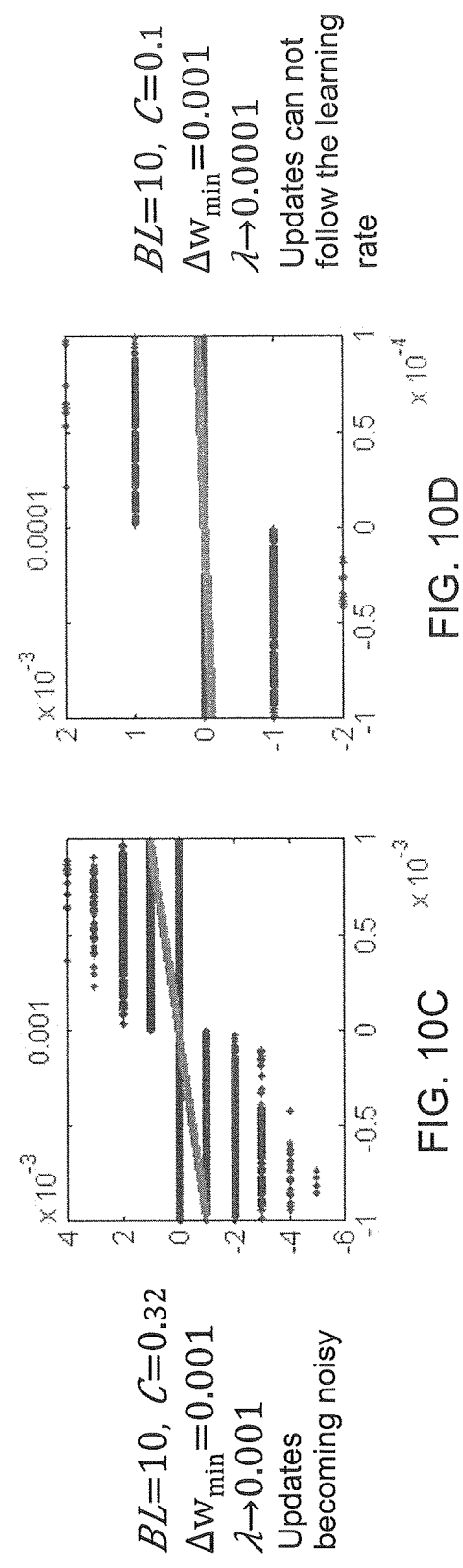
FIG. 10A — $BL=100$, $C=1$, $\Delta w_{min}=0.001$, $\lambda \to 0.1$, Long update time
FIG. 10B — $BL=10$, $C=1$, $\Delta w_{min}=0.001$, $\lambda \to 0.01$, Just right
FIG. 10C — $BL=10$, $C=0.32$, $\Delta w_{min}=0.001$, $\lambda \to 0.001$, Updates becoming noisy
FIG. 10D — $BL=10$, $C=0.1$, $\Delta w_{min}=0.001$, $\lambda \to 0.0001$, Updates can not follow the learning rate

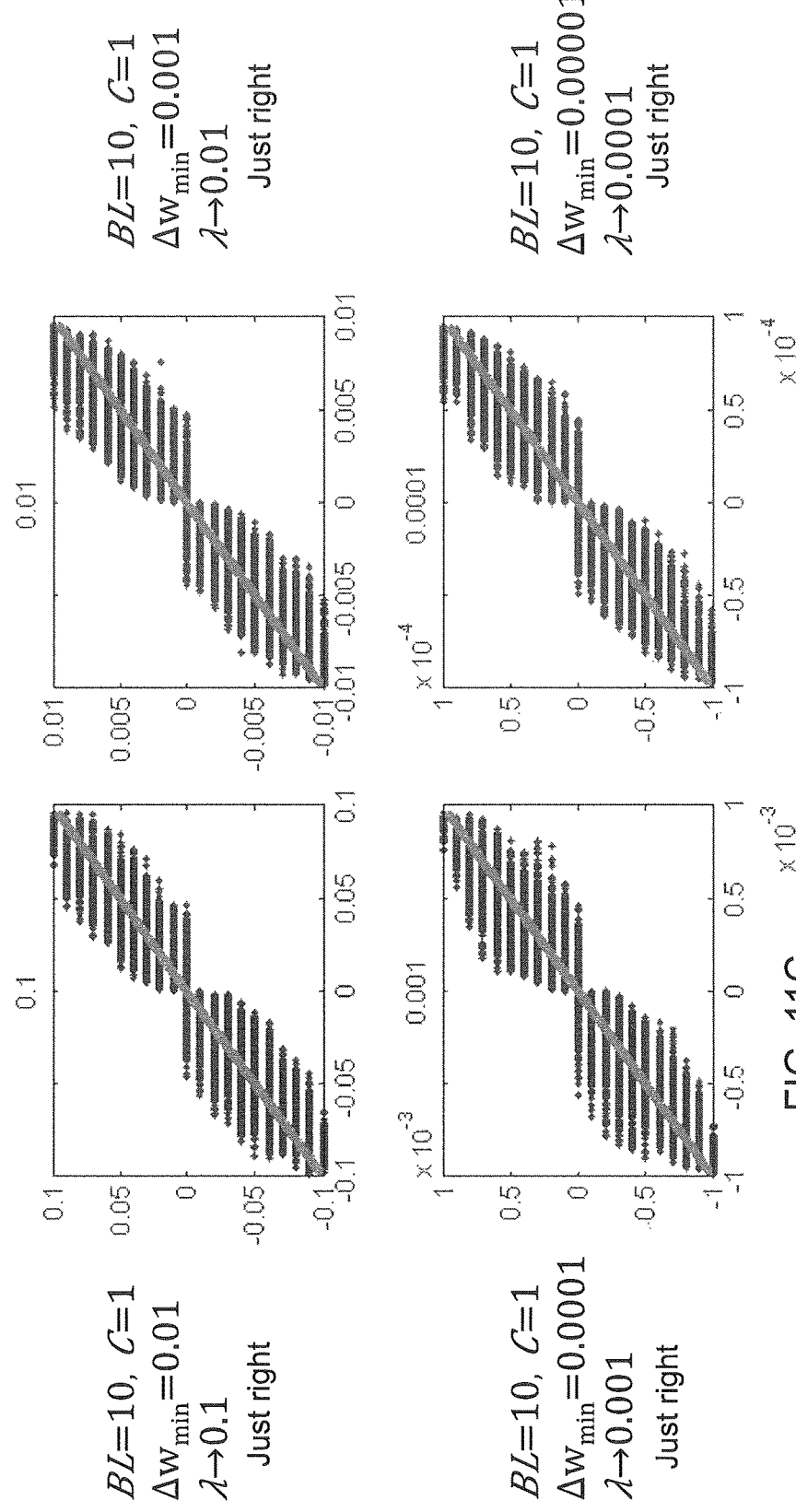

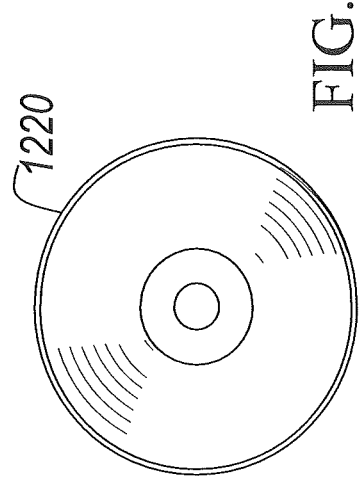
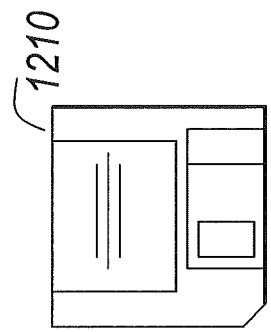
FIG. 13

VOLTAGE CONTROL OF LEARNING RATE FOR RPU DEVICES FOR DEEP NEURAL NETWORK TRAINING

BACKGROUND OF THE INVENTION

Field of the Invention

The present invention relates generally to a method and apparatus for Voltage Control of Learning Rate, and more particularly, but not by way of limitation, relating to a method, system, and apparatus for Voltage Control of Learning Rate for RPU Devices for Deep Neural Network Training.

Description of the Related Art

Deep Neural Networks (DNNs) demonstrated significant commercial success in the last years with performance exceeding sophisticated prior methods in speech and object recognition. However, training the DNNs is an extremely computationally intensive task that requires massive computational resources and enormous training time that hinders their further application. For example, a 70% relative improvement has been demonstrated for a DNN with 1 billion connections that was trained on a cluster with 1000 machines for three days. Training the DNNs relies in general on the backpropagation algorithm that is intrinsically local and parallel. Various hardware approaches to accelerate DNN training that are exploiting this locality and parallelism have been explored with a different level of success starting from the early 90s to current developments with GPU, FPGA or specially designed ASIC. Further acceleration is possible by fully utilizing the locality and parallelism of the algorithm. For a fully connected DNN layer that maps neurons to neurons significant acceleration can be achieved by minimizing data movement using local storage and processing of the weight values on the same node and connecting nodes together into a massive systolic array where the whole DNN can fit in. Instead of a usual time complexity, the problem can be reduced therefore to a constant time independent of the array size. However, the addressable problem size is limited to the number of nodes in the array that is challenging to scale up to billions even with the most advanced CMOS technologies. Novel nano-electronic device concepts based on non-volatile memory (NVM) technologies, such as phase change memory (PCM) and resistive random access memory (RRAM), have been explored recently for implementing neural networks with a learning rule inspired by spike-timing-dependent plasticity (STDP) observed in biological systems.

Only recently, their implementation for acceleration of DNN training using backpropagation algorithm have been considered with reported acceleration factors ranging from 27× to 900×, and even 2140× and significant reduction in power and area. All of these bottom-up approach of using previously developed memory technologies looks very promising, however the estimated acceleration factors are limited by device specifications intrinsic to their application as NVM cells.

Device characteristics usually considered beneficial or irrelevant for memory applications such as high on/off ratio, digital bit-wise storage, and asymmetrical set and reset operations, are becoming limitations for acceleration of DNN training. These non-ideal device characteristics can potentially be compensated with a proper design of peripheral circuits and a whole system, but only partially and with a cost of significantly increased operational time.

There is also a need to provide a more efficient technique of voltage control of learning rate for RPU devices for deep neural network training that avoids the increased computational complexities of previous methods.

SUMMARY OF INVENTION

In view of the foregoing and other problems, disadvantages, and drawbacks of the aforementioned background art, an exemplary aspect of the present invention provides a system, apparatus, and method of providing a method, system, and apparatus for voltage control of learning rate for RPU devices for deep neural network training.

One example aspect of the present invention provides a method of controlling resistive processing units (RPUs), including applying an input voltage signal to each node of an array of resistive processing units, and controlling a learning rate of the array of resistive processing units by varying an amplitude of the input voltage signal to the array of resistive processing units.

A conductance state of the array of resistive processing units is varied according to the amplitude received at each of the resistive processing units of the array of resistive processing units, and the controlling of the amplitude of input voltage signal is according to a processor of a control device. A voltage pulse height is controlled to vary the learning rate of a training on a resistive processing unit hardware including at least a two dimensional array of the resistive processing units. The array of resistive processing units is implemented in a neural network. The array of resistive processing units form at least a two dimensional array. The amplitude of a pulse of the input voltage signal is controlled for each node of the array of the resistive processing units. Each node of the array of resistive processing units includes a first terminal, a second terminal, and an active region having a conduction state. The conduction state identifies a weight of a training methodology applied to the resistive processing unit. The active region is configured to locally perform a data storage operation of the training methodology. The active region is further configured to locally perform a data processing operation of the training methodology. The active region is further configured to locally perform the data storage operation of the training methodology according to at least in part on the by the variable amplitude of the input voltage signal, and the active region is further configured to locally perform the data processing operation of the training methodology based at least in part on the by the variable amplitude of the input voltage signal.

In another example aspect of present invention, there is described a device for controlling resistive processing units (RPUs), the device including a computer readable storage medium storing program instructions, and a processor executing the program instructions, the processor configured to apply an input voltage signal to each node of an array of resistive processing units (RPUs), and control a learning rate of the array of resistive processing units by varying an amplitude of the input voltage signal to the array of resistive processing units.

In yet another example aspect of present invention, there is described a computer program product for controlling resistive processing units (RPUs), the computer program product including a computer readable storage medium having program instructions embodied therewith, the program instructions readable and executable by a computer to cause the computer to send an input voltage signal to each node of an array of resistive processing units, and control a learning rate of the array of resistive processing units by varying an amplitude of the input voltage signal to the array of resistive processing units.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 7A illustrates a conventional method (controlling learning rate with pulse duration).

FIG. 7B illustrates a proposed method (controlling learning rate with pulse amplitude).

FIG. 10A illustrates graph of a long update time rule with control of Bit length and C.

FIG. 10B illustrates an ideal graph where the learning rate $\lambda$ reaches 0.01 rule with control of Bit length and C.

FIG. 10C illustrates where the updates become noisy rule with control of Bit length and C.

FIG. 10D illustrates when the updates cannot follow the learning rate $\lambda$ rule with control of Bit length and C.

FIG. 11A through 11D illustrates a graph for different learning rates $\lambda$ when controlled through voltage.

FIG. 13 illustrates a signal-bearing storage medium for storing machine-readable instructions of a program that implements the method according to the exemplary embodiment of the invention.

DETAILED DESCRIPTION OF A PREFERRED EMBODIMENTS

Figures 1A, 1B:
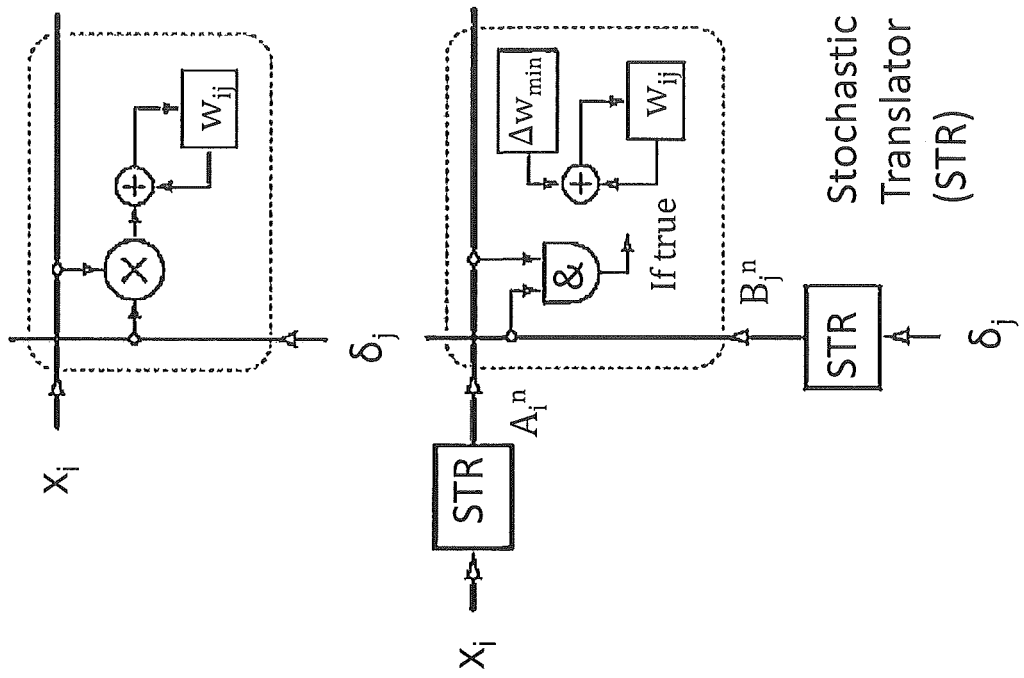
FIG. 1A illustrates Schematics of original weight update rule of Equation 1 performed at each cross-point.
FIG. 1B illustrates the stochastic update rule where numbers that are encoded from neurons.

The invention will now be described with reference to the drawing figures, in which like reference numerals refer to like parts throughout. It is emphasized that, according to common practice, the various features of the drawings are not necessarily to scale. On the contrary, the dimensions of the various features can be arbitrarily expanded or reduced for clarity. Exemplary embodiments are provided below for illustration purposes and do not limit the claims.

In a related art, there is a disclosure of how the learning rate can be controlled using the length of stochastic bits streams or the population probability of the stochastic bits streams. Those techniques make it possible to control the learning rate although each has some drawbacks. For very large learning rates increasing the bit length slows down the overall performance of the training. Similar for very small learning rates reducing the population probability of the streams would make the updates too stochastic and training may not achieve low enough accuracies. In the present invention, it is shown how the learning rate can be controlled by varying the voltage of the pulses so that the learning rate can be varied in a large range without sacrificing on training time and accuracies.

The present invention provides a proposed new class of devices (RPU) that can be used as processing units to accelerate various algorithms including neural network training. In the present invention it is shown how the operating voltage of these array of RPU devices can be controlled to tune the learning rate for the neural network training. One way of tuning the learning rate is by controlling time duration of the pulses, however for very large learning rates this approach would be significantly slow as very long duration might be needed for the update cycle. Whereas here the present invention proposes that the operating voltage can be controlled to achieve larger or smaller learning rates.

One of the features of the invention is to use a voltage pulse height control to vary the learning rate of DNN training on RPU hardware so that system does not sacrifice neither time (for large learning rates) nor accuracy (for small learning rates).

The described method has the advantage of controlling learning rate without changing the time needed for the update cycle. The present approach should therefore be faster than the approaches where the duration of pulses control the learning rate.

Artificial neural networks (ANNs) can formed from crossbar arrays of RPUs that provide local data storage and local data processing without the need for additional processing elements beyond the RPU. The trainable resistive crosspoint devices are referred to as resistive processing units (RPUs).

Crossbar arrays (crosspoint arrays or crosswire arrays) are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which may be formed from thin film material.

Crosspoint devices, in effect, function as the ANN's weighted connections between neurons. Nanoscale two-terminal devices, for example memristors having conduction state switching characteristics, are often used as the crosspoint devices in order to emulate synaptic plasticity with high energy efficiency. The conduction state (e.g., resistance) of the memristive material may be altered by controlling the voltages applied between individual wires of the row and column wires.

The backpropagation algorithm is composed of three cycles, forward, backward and weight update that are repeated many times until a convergence criterion is met. The forward and backward cycles mainly involve computing vector matrix multiplication in forward and backward directions. This operation can be performed on a 2D crossbar array of two terminal resistive devices as it was proposed more than 50 years ago. In forward cycle, stored conductance values in the crossbar array form a matrix, whereas the input vector is transmitted as voltage pulses through each of the input rows. In a backward cycle, when voltage pulses are supplied from columns as an input, then the vector-matrix product is computed on the transpose of a matrix. These operations achieve the required O(1) time complexity, but only for two out of three cycles of the training algorithm.

In contrast to forward and backward cycles, implementing the weight update on a 2D crossbar array of resistive devices locally and all in parallel, independent of the array size, is challenging. It requires calculating a vector-vector outer product which consist of a multiplication operation and an incremental weight update to be performed locally at each cross-point as illustrated in FIG. 1A. The corresponding update rule is usually expressed as:

$$w_{ij} \leftarrow w_{ij} + \eta x_i \delta_j \quad (1)$$

where $w_{ij}$ represents the weight value for the $i^{th}$ row and the $j^{th}$ column (for simplicity layer index is omitted) and $x_i$ is the activity at the input neuron, $\delta_j$ is the error computed by the output neuron and $\eta$ is the global learning rate.

In order to implement a local and parallel update on an array of two-terminal devices that can perform both weight storage and processing (Resistive Processing Unit or RPU) we first propose to significantly simplify the multiplication operation itself by using stochastic computing techniques. It has been shown that by using two stochastic streams the multiplication operation can be reduced to a simple AND operation. FIG. 1B illustrates the stochastic update rule where numbers that are encoded from neurons ($x_i$ and $\delta_j$) are translated to stochastic bit streams using stochastic translators (STR). Then they are sent to the crossbar array where each RPU device changes its conductance ($g_{ij}$) slightly when bits from $x_i$ and $\delta_j$ coincide. In this scheme we can write the update rule as follows:

$$w_{ij} \leftarrow w_{ij} \pm \Delta w_{min} \sum_{n=1}^{BL} A_i^n \wedge B_j^n \quad (2)$$

where BL is length of the stochastic bit stream at the output of STRs that is used during the update cycle, $\Delta w_{min}$ is the change in the weight value due to a single coincidence event, $A_i^n$ and $B_j^n$ are random variables that are characterized by Bernoulli process, and a superscript n represents bit position in the trial sequence. The probabilities that $A_i^n$ and $B_j^n$ are equal to unity are controlled by $Cx_i$ and $C\delta_j$, respectively, where C is a gain factor in the STR.

Figure 1C:
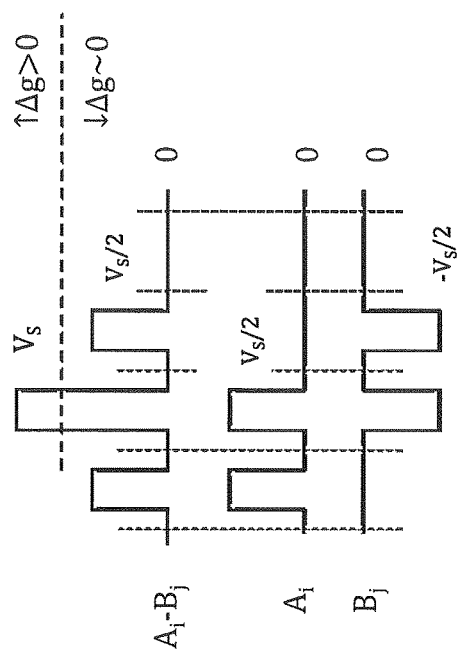
FIG. 1C illustrates one possible pulsing scheme that enables the stochastic update.
Figure 1D:
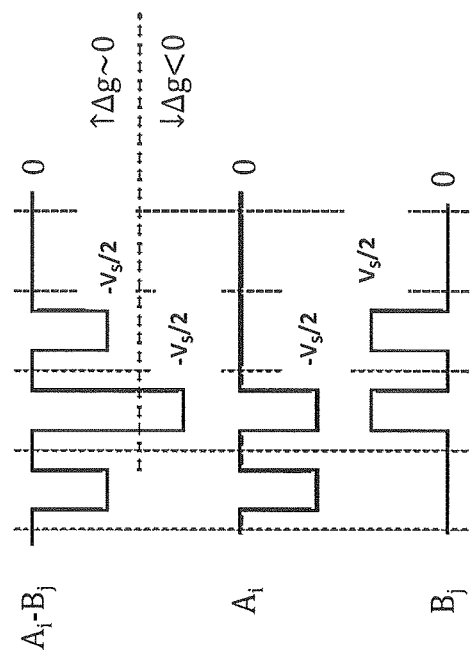
FIG. 1D illustrates Pulsing scheme that enables the implementation of stochastic updates rule by RPU devices for down conductance changes.

One possible pulsing scheme that enables the stochastic update rule of Eq. 2 is presented in FIG. 1C. The voltage pulses with positive and negative amplitudes are sent from corresponding STRs on rows ($A_i$) and columns ($B_j$), respectively. As opposed to a floating point number encoded into a binary stream, the corresponding number translated into a stochastic stream is represented by a whole population of such pulses. In order for a two-terminal RPU device to distinguish coincidence events at a cross-point, its conductance value should not change significantly when a single pulse $V_S/2$ is applied to a device from a row or a column. However, when two pulses coincide and the RPU device sees the full voltage ($V_S$) the conductance should change by nonzero amount $\Delta g_{min}$. The parameter $\Delta g_{min}$ is proportional to $\Delta w_{min}$ through the amplification factor defined by peripheral circuitry. To enable both up and down changes in conductance the polarity of the pulses can be switched during the update cycle as shown in FIG. 1D. The proposed pulsing scheme allows all the RPU devices in an array to work in parallel and perform the multiplication operation locally by simply relying on the statistics of the coincidence events, thus achieving the O(1) time complexity for the weight update cycle of the training algorithm.

Figures 2A, 2B, 2C:
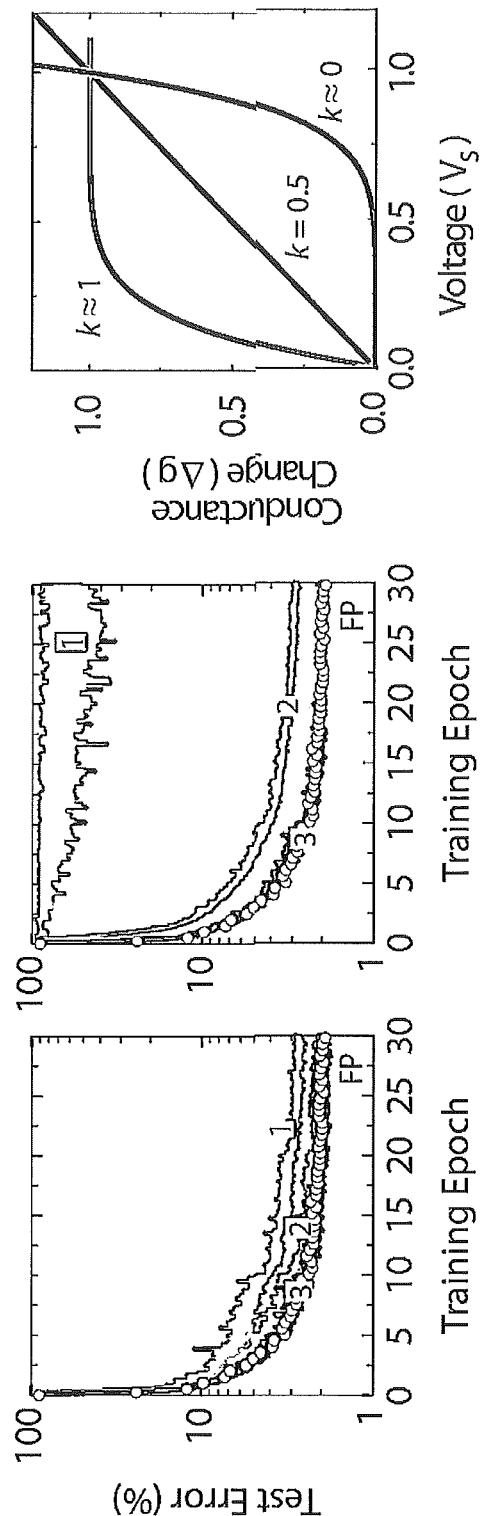
FIG. 2A illustrates a classification error curve including a baseline model.
FIG. 2B illustrates a classification error curve including a baseline model where a non-linearity factor is varied.
FIG. 2C illustrates three set of conductance change versus voltage curves for different non-linearity factors.

Network training with RPU array using stochastic update rule is shown in the following. To test the validity of this approach, we compare classification accuracies achieved with a deep neural network composed of fully connected layers with 784, 256, 128 and 10 neurons, respectively. This network is trained with a standard MNIST training dataset of 60,000 examples of images of handwritten digits using cross-entropy objective function and backpropagation algorithm. Raw pixel values of each 28×28 pixel image are given as inputs, while sigmoid and softmax activation functions are used in hidden and output layers, respectively. The temperature parameter for both activation functions is assumed to be unity. FIGS. 2A through 2B show a set of classification error curves for the MNIST test dataset of 10,000 images.

Specifically, FIG. 2A illustrates a classification error curve including a baseline model. The curve marked with open circles in FIG. 2A corresponds to a baseline model where the network is trained using an update rule as defined by Eq. 1 with a floating point multiplication operation. Typically, batch training is performed to decrease the number of updates and hence reduce the overall training time. Here, in order to test the most update demanding case, the batch size of unity is chosen throughout the following experiments. Training is performed repeatedly for all 60,000 images in training dataset, which constitutes a single training epoch. Learning rates of η=0.01, 0.005 and 0.0025 for epochs 0-10, 11-20 and 21-30, respectively, are used. The baseline model reaches classification error of 2.0% on the test data in 30 epochs.

In order to make a fair comparison between the baseline model and the stochastic model in which the training uses the stochastic update rule of Eq. 2, the learning rates need to match. In the most general form the average change in the weight value for the stochastic model can be written as $$E(\Delta w_{ij}) = BL\Delta w_{min}C^2 x_i \delta_j \quad (3)$$

Therefore the learning rate for the stochastic model is controlled by three parameters, $\Delta w_{min}$, and C that should be adjusted to match the learning rates that are used in the baseline model.

Although the stochastic update rule allows substituting multiplication operation with a simple AND operation, the result of the operation, however, is no longer exact, but probabilistic with a standard deviation to mean ratio that scales with $1/\sqrt{BL}$. Increasing the stochastic bit stream length BL would decrease the error, but in turn would increase the update time. In order to find an acceptable range of BL values that allow to reach classification errors similar to the baseline model, we performed training using different BL values while setting $\Delta w_{min}=\eta/BL$ and C=1 in order to match the learning rates used for the baseline model as discussed above. As it is shown in FIG. 2A, BL as small as 10 is sufficient for the stochastic model to become indistinguishable from the baseline model.

To determine how strong non-linearity in the device switching characteristics is required for the algorithm to converge to classification errors comparable to the baseline model, a non-linearity factor is varied as shown FIG. 2B. The non-linearity factor is defined as the ratio of two conductance changes at half and full voltages as $$k = \frac{\Delta g(V_S/2)}{\Delta g(V_S)}.$$

FIG. 2C illustrates a set of conductance change response of RPU devices versus voltage. As shown in FIG. 2C, the values of k≈1 correspond to a saturating type non-linear response, when k=0.5 the response is linear as typically considered for a memristor, and values of k≈0 corresponds to a rectifying type non-linear response. As it is shown in FIG. 2B the algorithm fails to converge for the linear response, however, a non-linearity factor k below 0.1 is enough to achieve classification errors comparable to the baseline model.

These results validate that although the updates in the stochastic model are probabilistic, classification errors can become indistinguishable from those achieved with the baseline model. The implementation of the stochastic update rule on an array of analog RPU devices with non-linear switching characteristics effectively utilizes the locality and the parallelism of the algorithm. As a result the update time is becoming independent of the array size, and is a constant value proportional to BL, thus achieving the required O(1) time complexity.

Figure 3:
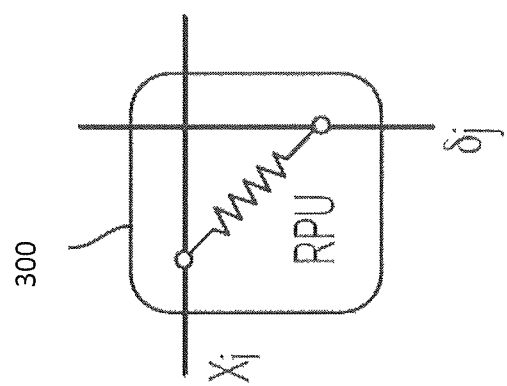
FIG. 3 illustrates an example RPU.

FIG. 3 shows an example RPU 300, which receives and responds to the stochastic voltage sequences. It is noted that Δg, which is the change in the RPU's conduction value in response to the voltage sequences applied at $x_i$ and $\delta_j$. More specifically, Δg is the response of RPU 300 to a voltage pulse that reaches $V_{DD}$.

Figure 4:
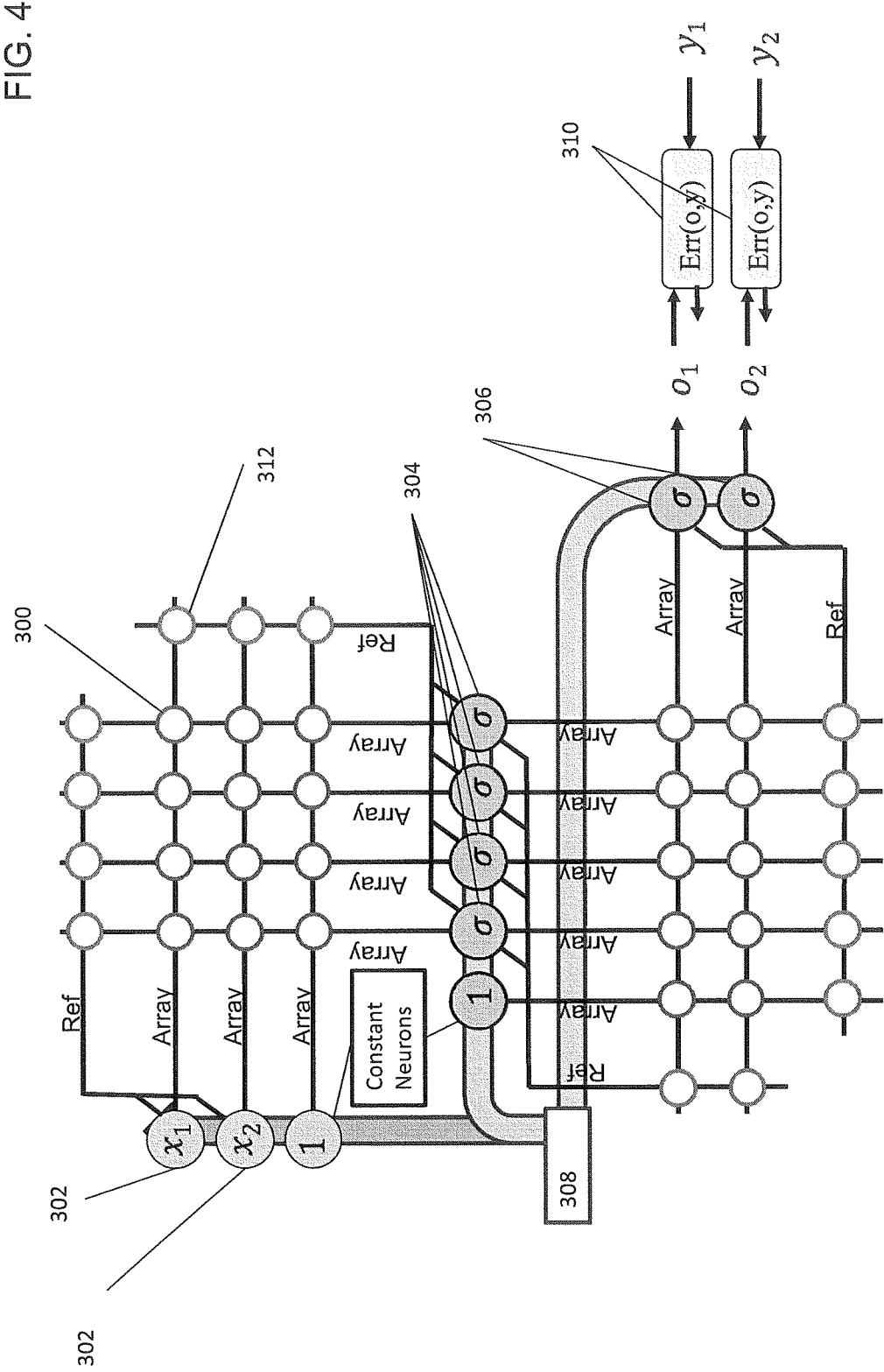
FIG. 4 illustrates a system architecture.

FIG. 4 illustrates a system architecture. The RPU device 300 is provided in the array 302. The neurons are integrated in CMOS circuitry with cross bar array of devices, which stores a matrix. The input neurons 302, along with the hidden neuron layers 306 and output neurons 304 and input signals 308 are shown. The neurons states are backward, forward and update. The units providing error 310 is also shown. Static Reference Resistance RPU can be used here as well 312.

Figure 5:
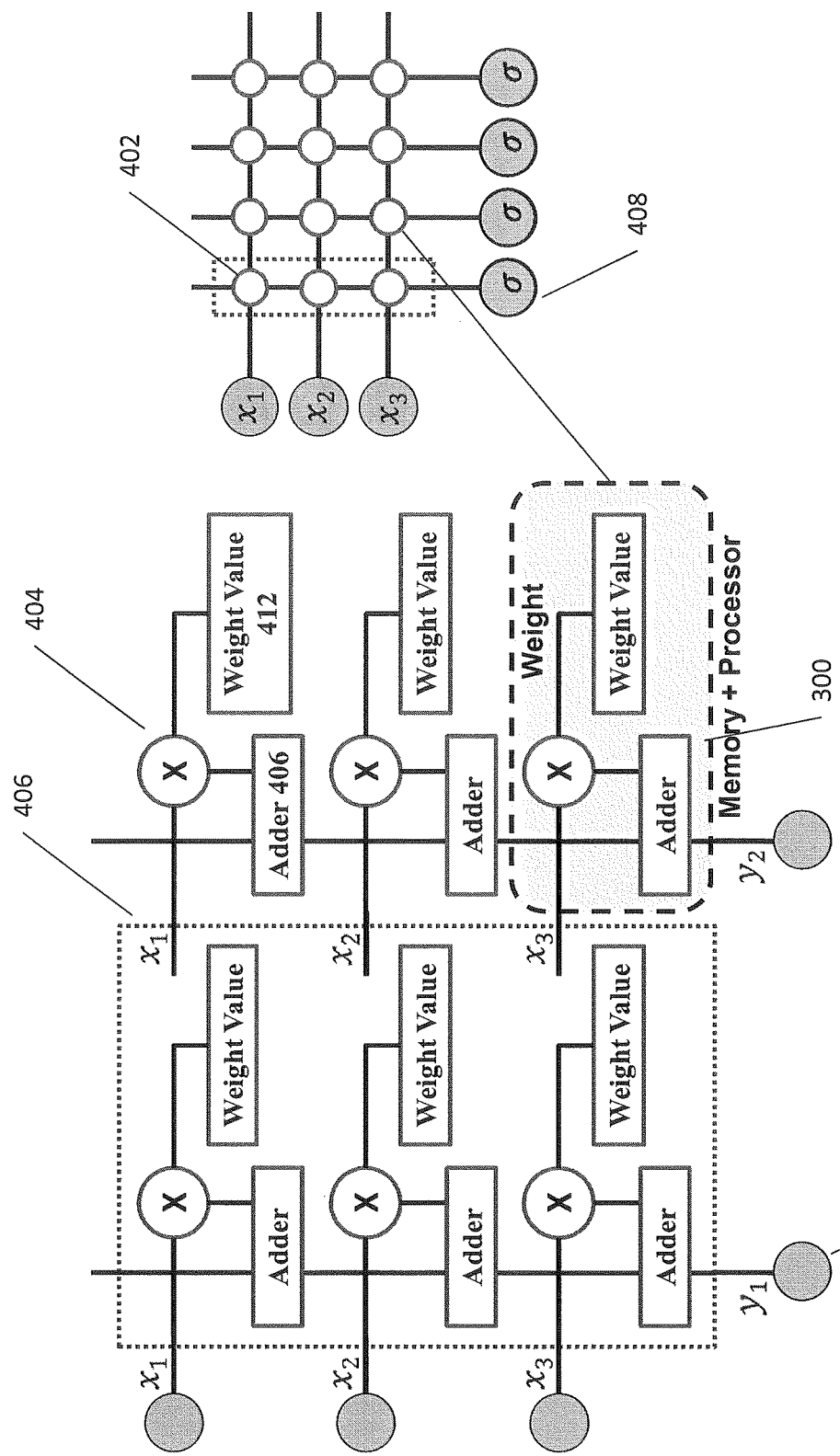
FIG. 5 illustrates Operation of the Block (Forward and Backward Pass).

FIG. 5 illustrates Operation of the Block (Forward and Backward Pass). The weights 402 are shown with weight value 404 for each of the RPUs 300 in an array. The input neurons 406 ($x_1$, $x_2$ and $x_3$) are connected to hidden neurons (σ) 408. Weights 402 (shown with weight values 412), which represent a strength of connection, are applied at the connections between the input neurons/nodes and the hidden neurons/nodes, as well as between the hidden neurons/nodes 406 and the output neurons/nodes y 420. The weights 402 form of a matrix. As data moves forward through the network, vector matrix multiplications 404 are performed, wherein the hidden neurons/nodes take the inputs, perform a non-linear transformation, and then send the results to the next weight matrix. This process continues until the data reaches the output neurons/nodes. The output neurons/nodes evaluate the classification error, and then propagate this classification error back in a manner similar to the forward pass, which results in a vector matrix multiplication being performed in the opposite direction. For each data set, when the forward pass and backward pass are completed, a weight update is performed. Basically, each weight will be updated proportionally to the input to that weight as defined by the input neuron/node 402 and the error computed by the neuron/node to which it is connected.

Figure 6A:
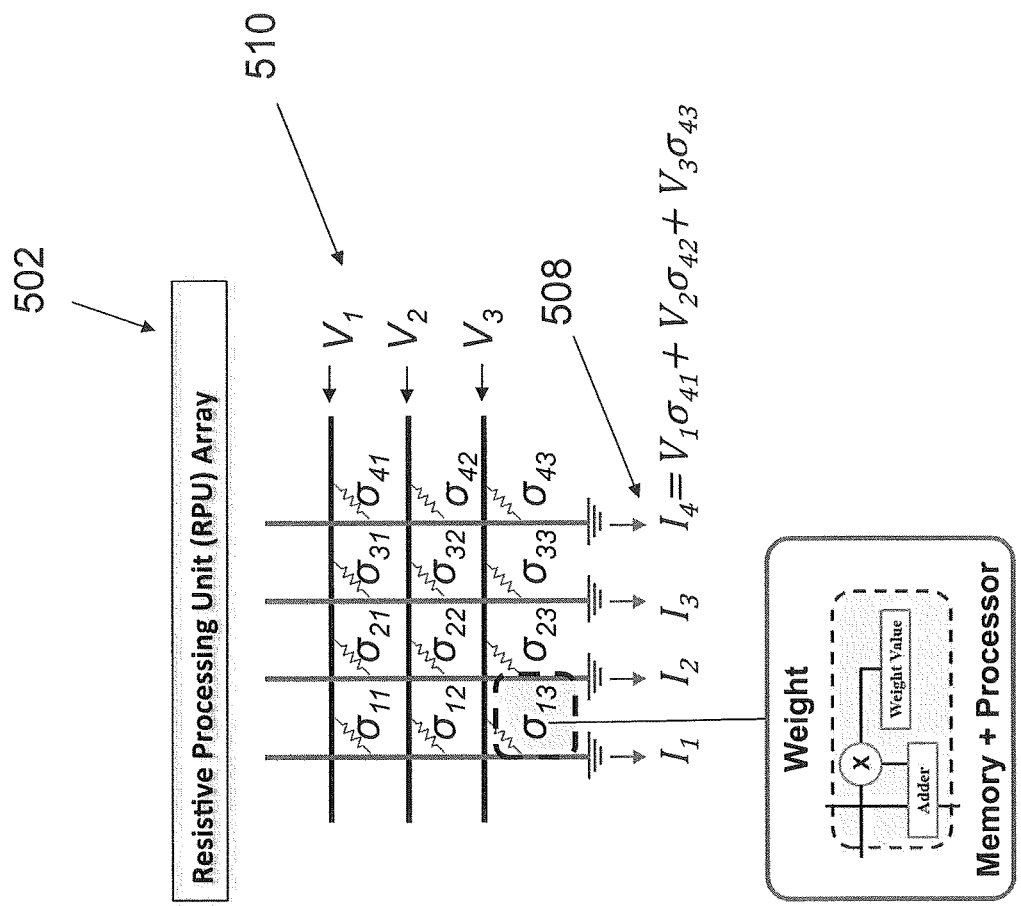
FIG. 6A illustrates Resistive Cross-Point Array Forward Pass.

FIG. 6A illustrates Resistive Cross-Point Array Forward Pass. An example resistive cross-point array (RPU) 502 is provided. The output vector "y" is the current, while the input vector "x" is the voltage. The stored weight "W" is shown which is the conductance matrix σ. The computation is parallel and no memory operation.

$$\begin{pmatrix} I_1 \\ I_2 \\ I_3 \\ I_4 \end{pmatrix} = \begin{pmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \\ \sigma_{41} & \sigma_{42} & \sigma_{43} \end{pmatrix} \begin{pmatrix} V_1 \\ V_2 \\ V_3 \end{pmatrix}$$

The current vector $I_1$ to $I_4$ 508 is the output vector "y", while the input vector "x" is shown as the vector $V_1$ to $V_3$ 510 with the conductance matrix σ.

Figure 6B:
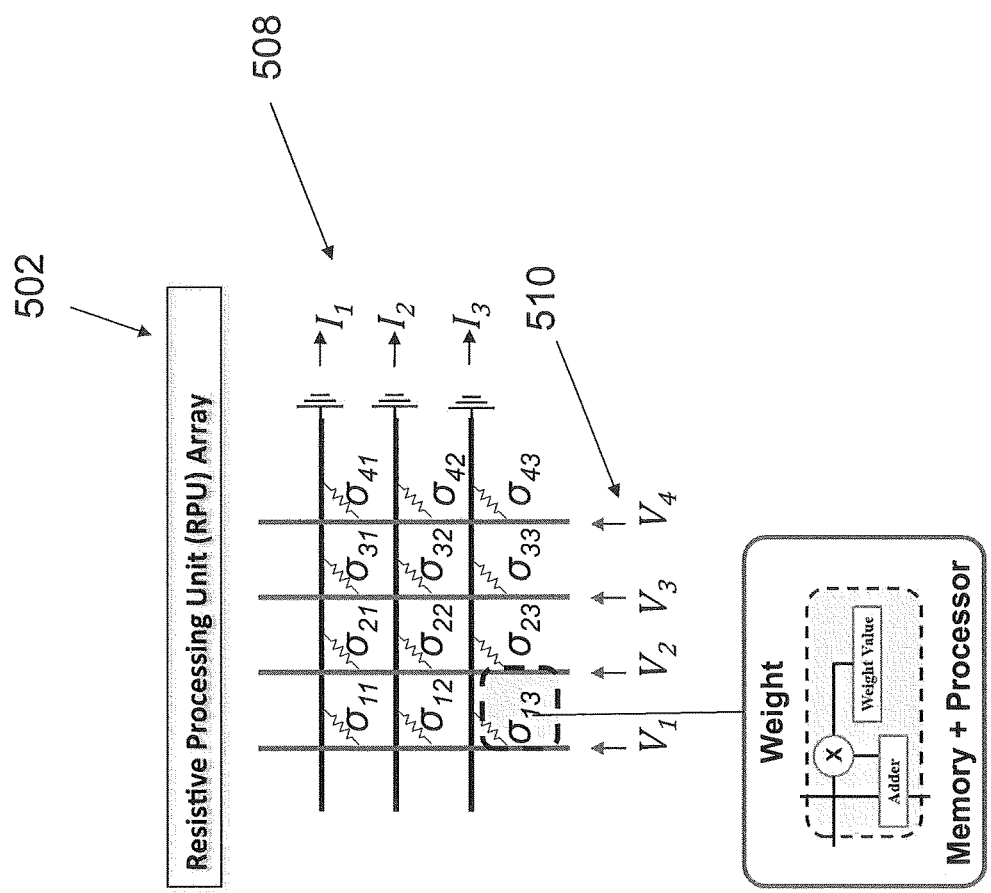
FIG. 6B illustrates Resistive Cross-Point Array Backward Pass.

FIG. 6B illustrates Resistive Cross-Point Array Backward Pass. An example resistive cross-point array (RPU) 502 is provided where output vector "y" is the current, while the input vector "x" is the voltage. The stored weight "W" is shown which is the conductance matrix G. The computation is parallel and there is no memory operation. The current vector $I_1$ to $I_3$ 508 is the output vector "y", while the input vector "x" is shown as the vector $V_1$ to $V_4$ 510 with the conductance matrix G.

Figure 6C:
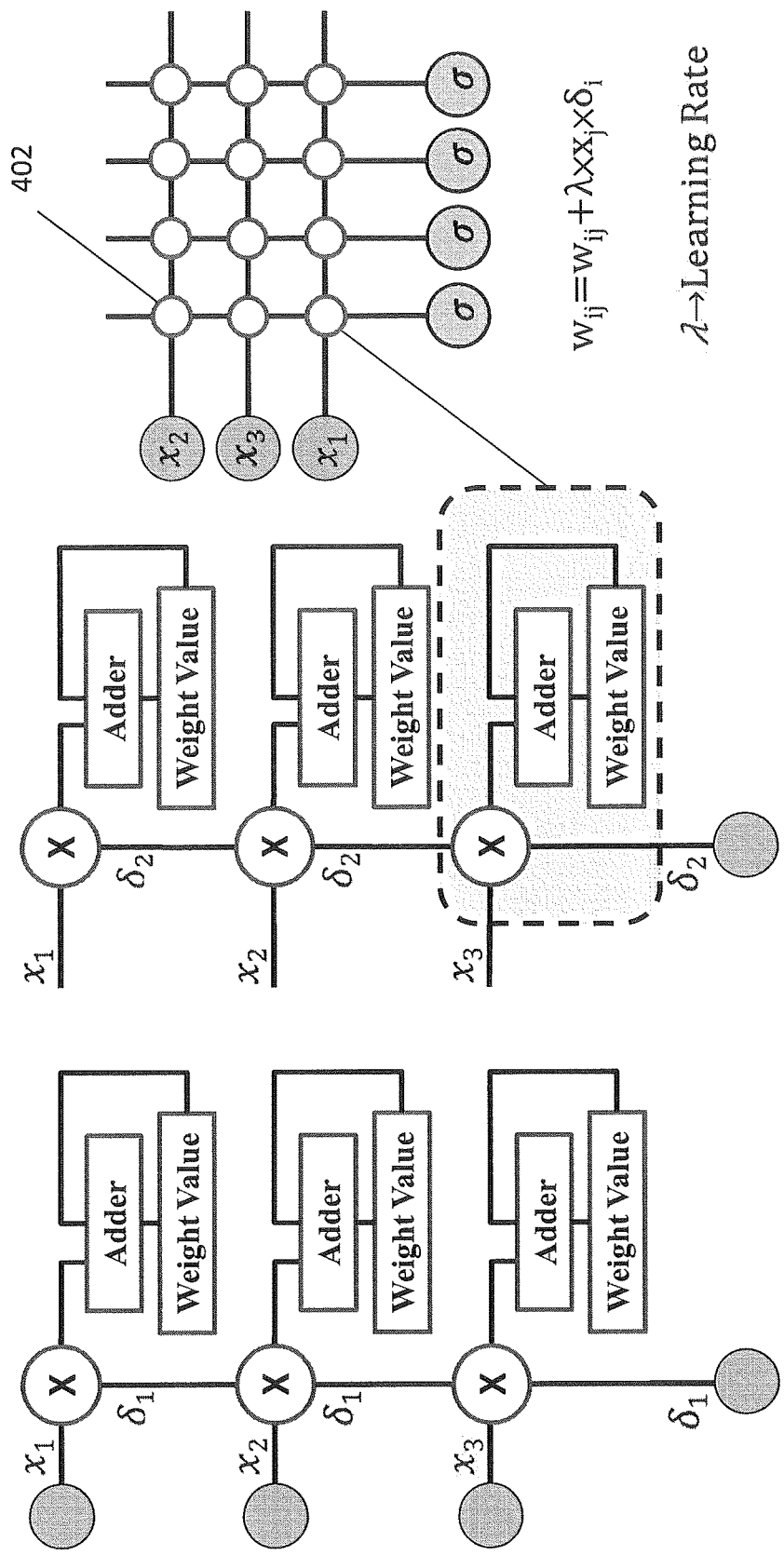
FIG. 6C illustrates a weight update cycle.

FIG. 6C illustrates a weight update cycle. Receive a vector x1 to x3 from rows and receive another vector δ1 to δ2 from cols and by using an adder and weight value, the calculation of $w_{ij}=w_{ij}+x_j \times \delta_i$ is made at each node.

FIG. 7A illustrates a conventional method (controlling learning rate with pulse duration). Here there is sent longer pulses for larger learning rates (λ) and send shorter pulses for smaller learning rates as shown in the pulses. For large learning rates (λ) updates become slow due to increase in the time duration (t) of the pulses. Problem is that sometimes at most you can send one pulse.

FIG. 7B illustrates a proposed method (controlling learning rate with pulse amplitude). In the proposed method of the present invention, there is a controlling of learning rate with pulse amplitude. The system sends pulses with larger voltage amplitude for larger learning rates and sends pulses with smaller voltage amplitude for smaller learning rates. For large learning rates (λ) pulses with larger amplitude (V) but same time duration (t) is used and therefore updates can be performed always fast even for large learning rates. Therefore, the modulation of the pulse amplitude is beneficial. The pulse amplitude can be controlled by a dedicated control device, computer, apparatus, or system.

The minimum change in conductance in RPU can be translated to minimum change in the weight value $$\Delta g_{min} \rightarrow \Delta \Delta w_{min}$$

Figures 8A, 8B:
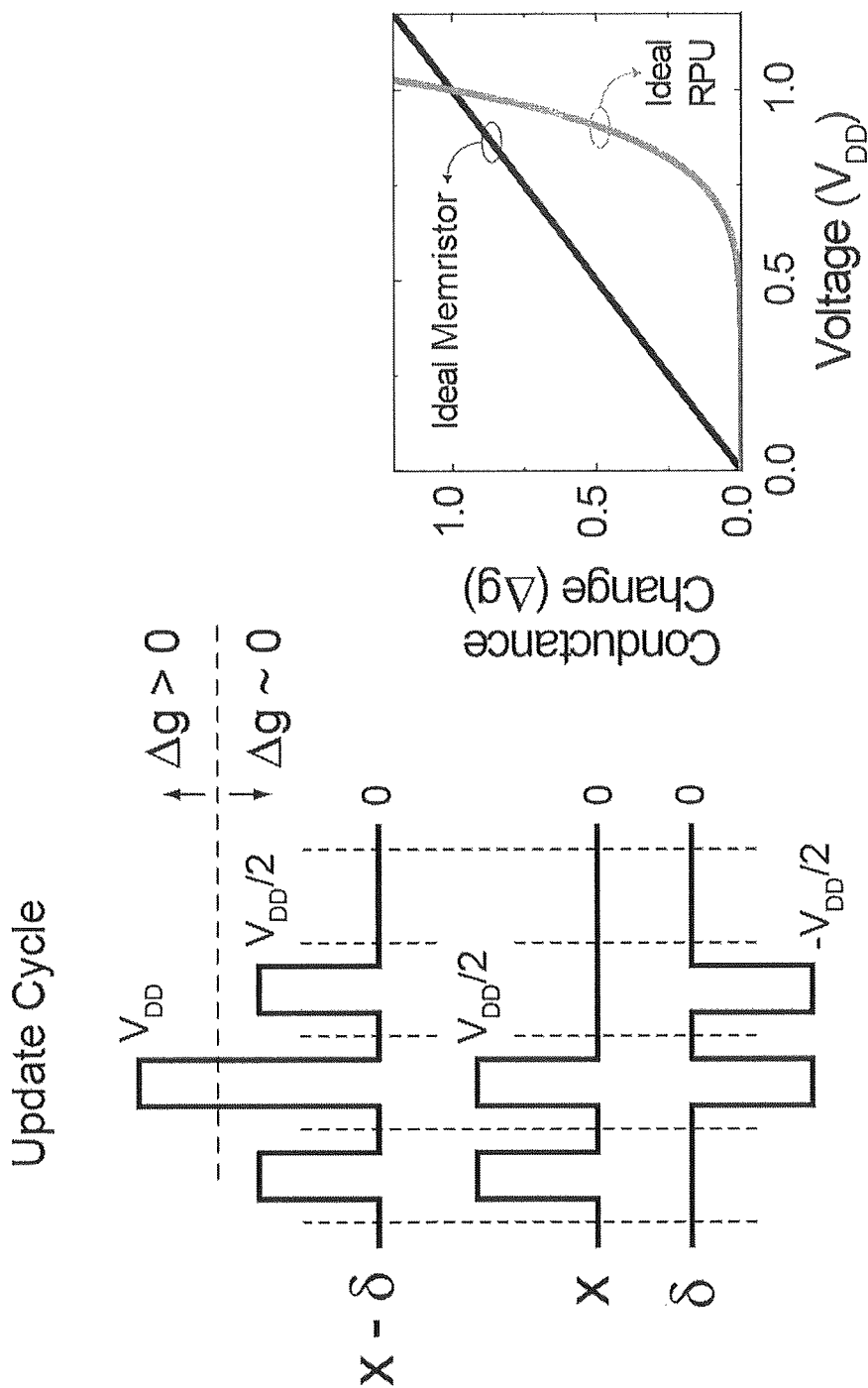
FIG. 8A illustrates the update cycle.
FIG. 8B illustrates a graph of the conductance change versus voltage.

FIG. 8A illustrates the update cycle. The present invention proposes that instead of longer (shorter) update cycles being used to control the learning rate, one can tune $V_{DD}$ that is used during the update cycle in order change the magnitude of minimum update. This way duration of the update cycle is kept constant (for further speed up), where the learning rate is controlled by tuning the operating voltage ($V_{DD}$) of the RPU devices at the update cycle as shown.

FIG. 8B illustrates a graph of the conductance change versus voltage. Specifically, the conductance change Δg versus the voltage $V_{DD}$ for an ideal memrister and an ideal RPU.

Figure 9:
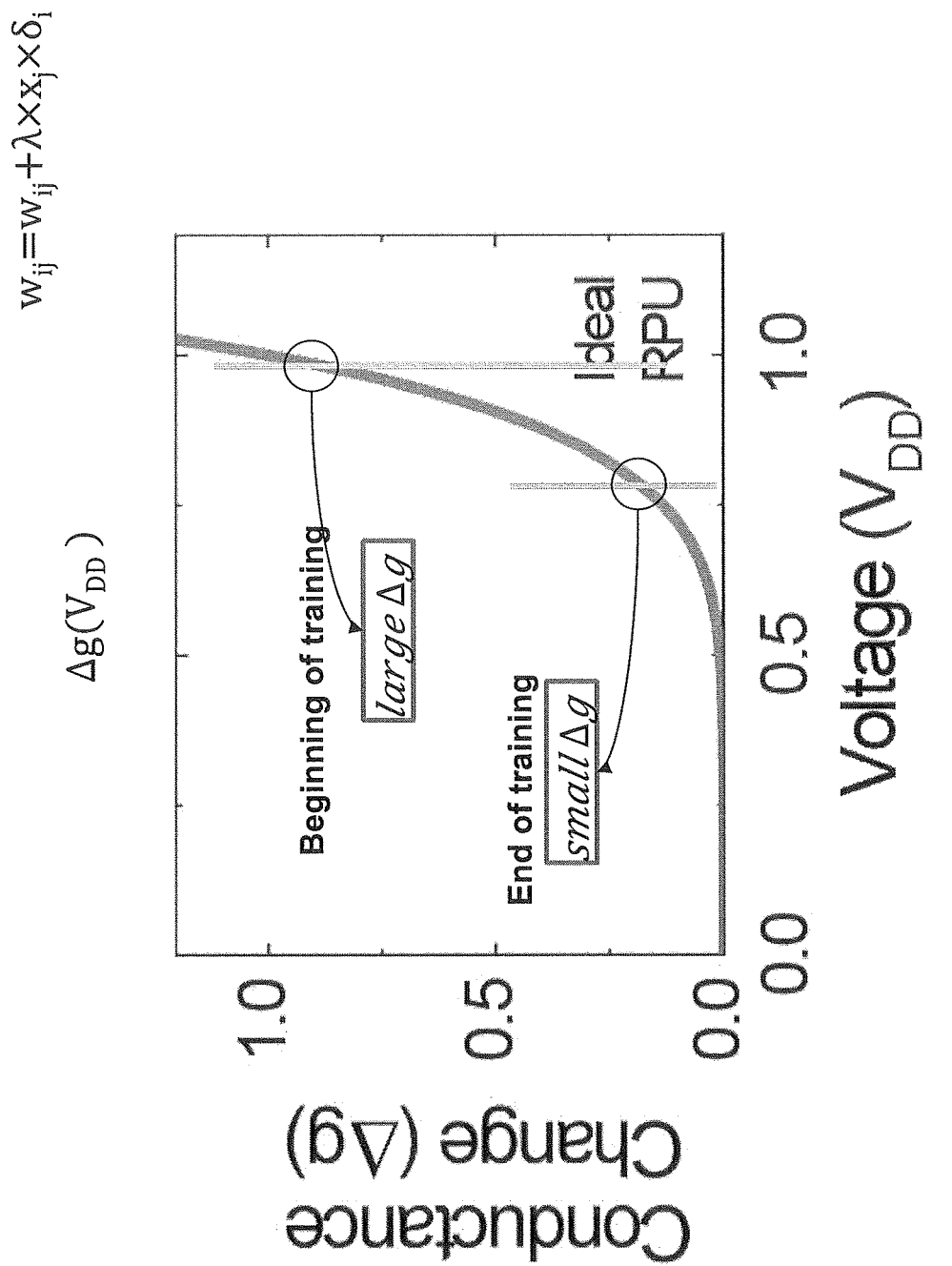
FIG. 9 illustrates a graph of the conductance change versus voltage for the RPU.

FIG. 9 illustrates a further review of the graph of the conductance change versus voltage for the RPU. There is a point 902 for the beginning of training where conductance change Δg is large and at the end of training where conductance change Δg is small at point 904 of the curve. Therefore, the learning rate is controlled by simply controlling the voltage amplitude.

FIG. 10A illustrates graph of a long update time for a stochastic update rule with control of Bit length and C. The learning rate λ reaches 0.1 and bit length (BL) is 100. FIG. 10B illustrates an ideal graph where the learning rate λ reaches 0.01. FIG. 10C illustrates where the updates become noisy and FIG. 10D illustrates when the updates cannot follow the learning rate λ. X axis the update you want to do and Y axis is the actual updates performed by the devices. The problem is that when one lowers the learning rate, the signal to noise ratio becomes large.

FIG. 11A through 11D illustrates an ideal graph for different learning rates λ from 0.1 to 0.0001 when $\Delta w_{min}$ is controlled through voltage. The BL and C are fixed. Here you can see the signal to noise ratio is fixed no matter what is the learning rate.

Parts of one or more embodiments may be a device, a system, a method and/or a computer program product to control the amplitude of the voltage pulse signal. The computer program product in accordance with one or more embodiments includes a computer readable storage medium (or media) having program instructions thereon for causing a processor to carry out aspects of one or more embodiments.

Figure 12:
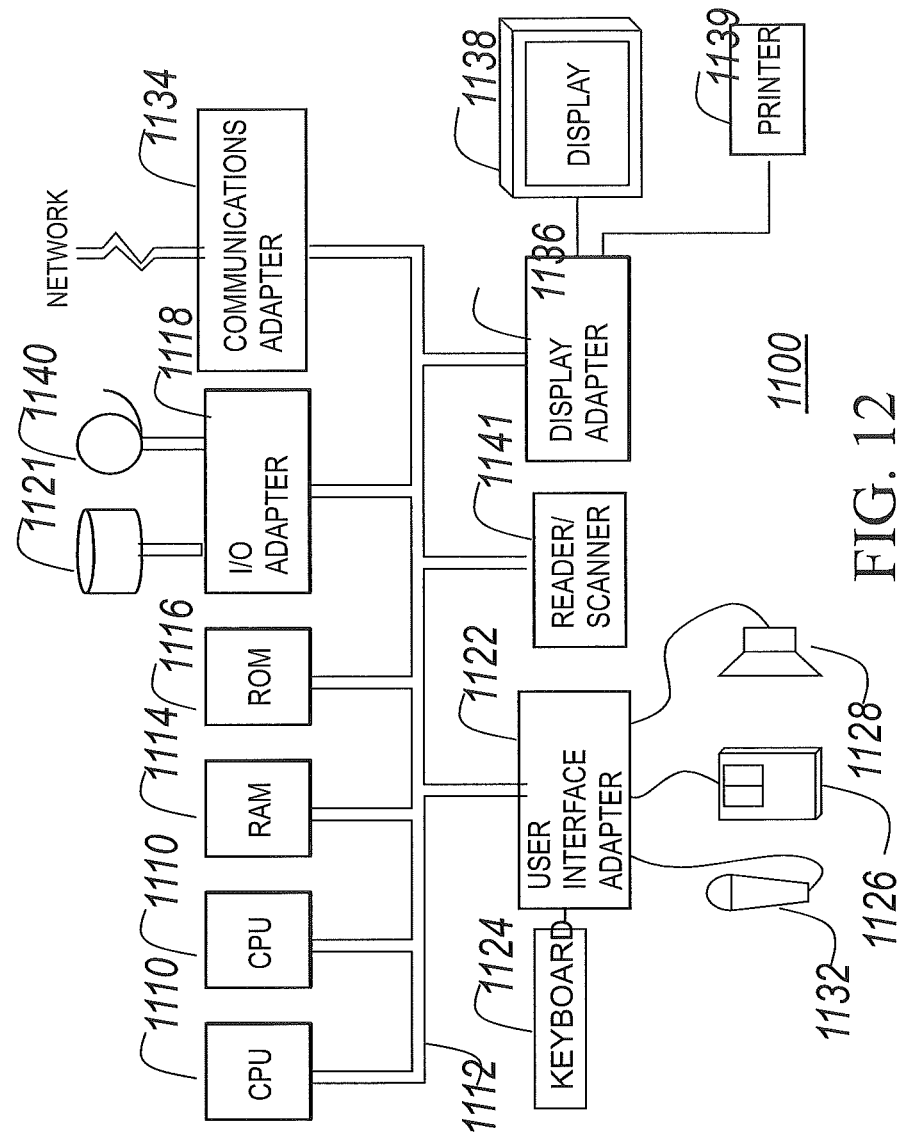
FIG. 12 illustrates an exemplary hardware/information handling system for incorporating the exemplary embodiment of the invention therein.

FIG. 12 illustrates another hardware configuration of an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, reader/scanner 1141 and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 13), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
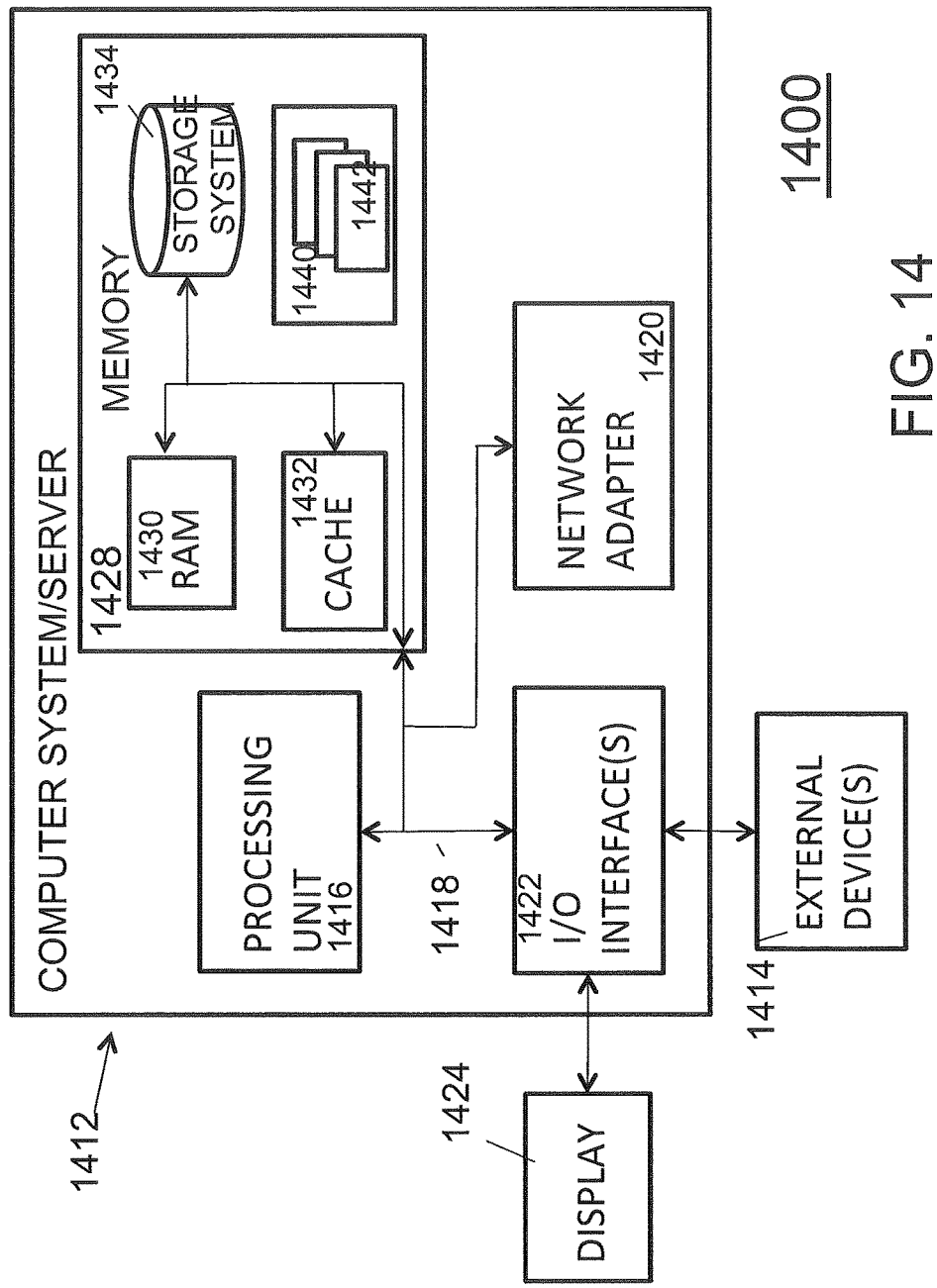
FIG. 14 depicts a cloud computing node according to an embodiment of the present invention.

Referring now to FIG. 14, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
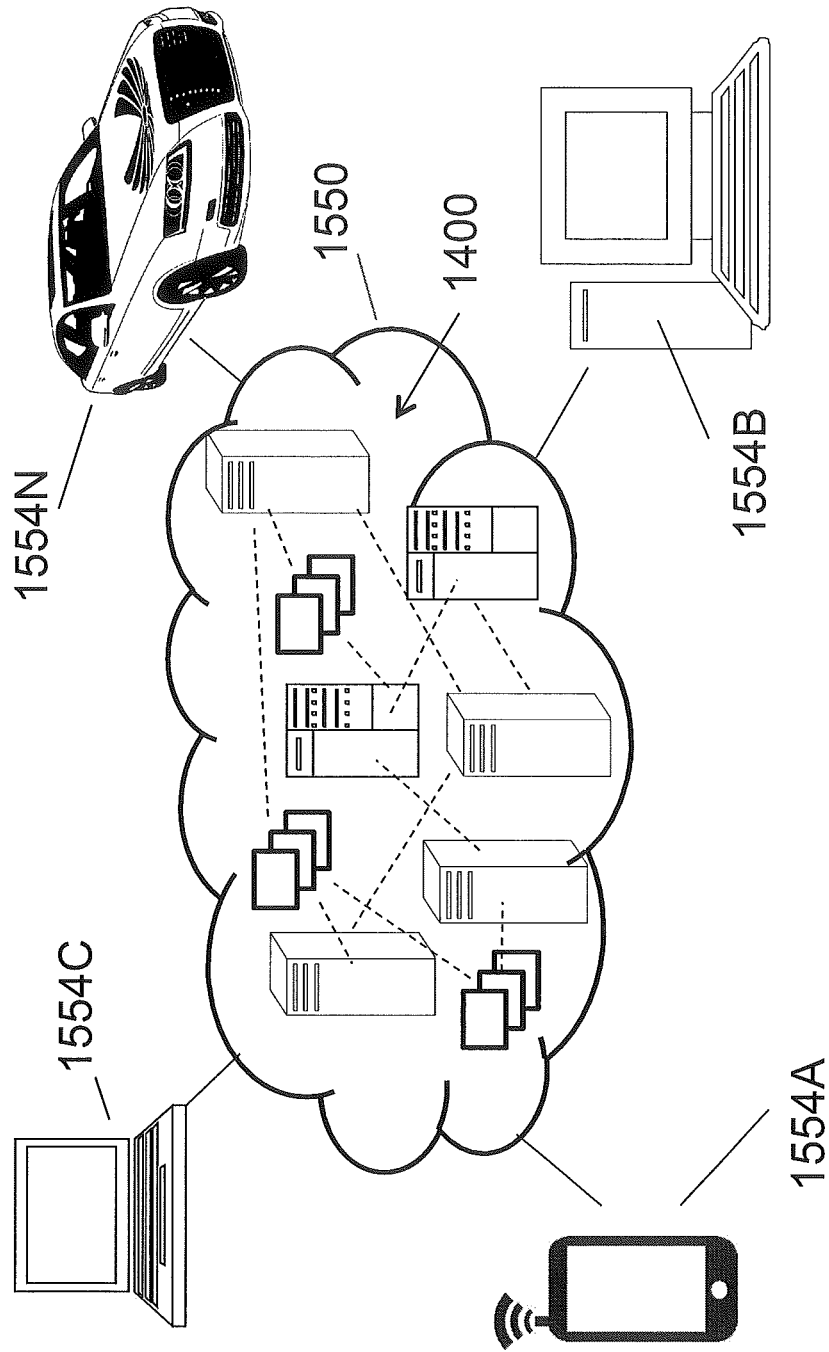
FIG. 15 depicts a cloud computing environment according to an embodiment of the present invention.

Referring now to FIG. 15, illustrative cloud computing environment 1550 is depicted in system 1500. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1400 and cloud computing environment 1550 can communicate with any type of computerized device over any type of network and/or network addressable connection (e.g., using a web browser).

Figure 16:
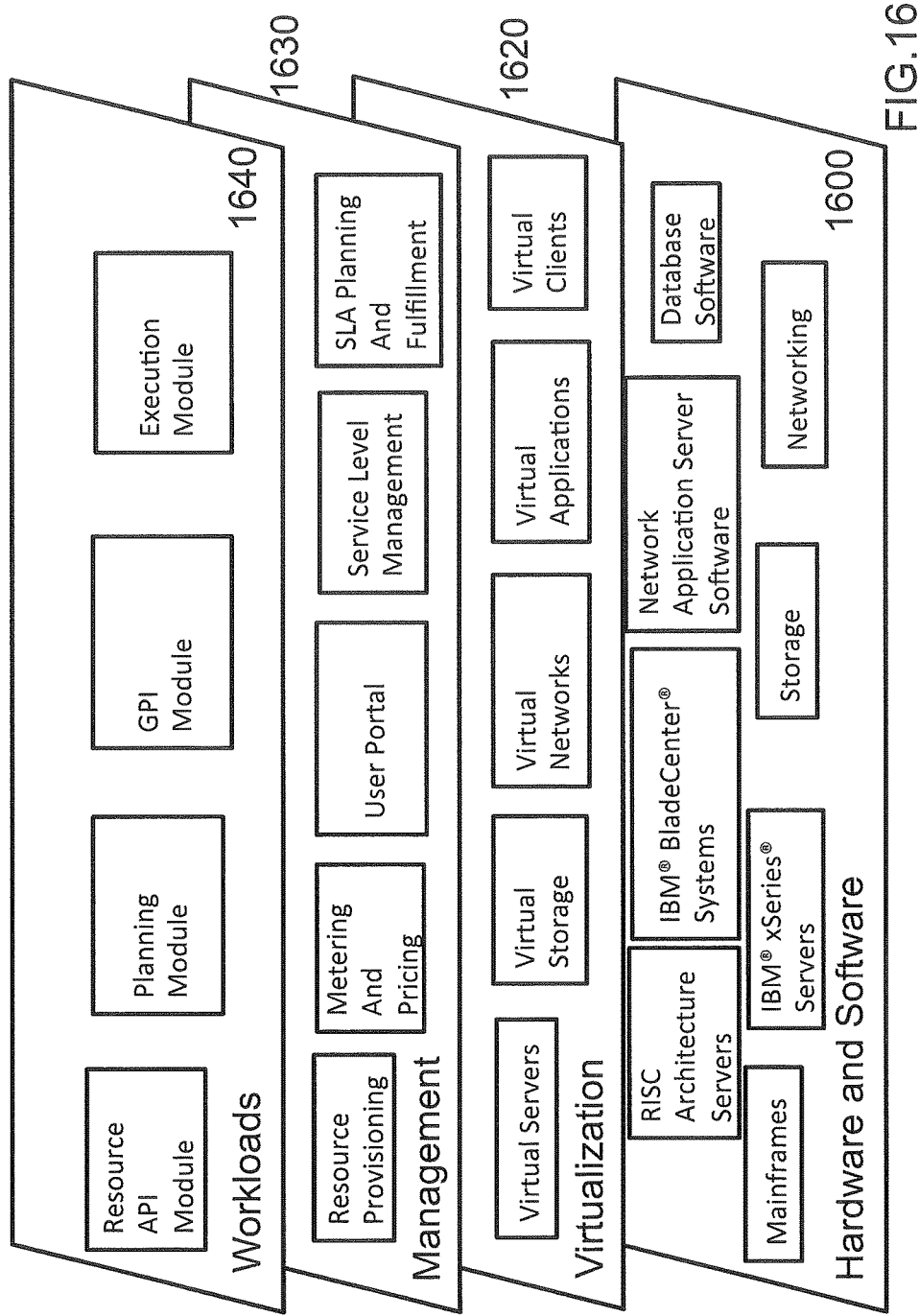
FIG. 16 depicts abstraction model layers according to an embodiment of the present invention.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of controlling resistive processing units (RPUs), comprising:
    applying an input voltage signal to each node of an array of resistive processing units; and
    controlling a learning rate of the array of resistive processing units in accordance with a change in an amplitude of a pulse of the input voltage signal to each node of the array of resistive processing units,
    wherein a conductance state of the array of resistive processing units is varied according to the amplitude of the pulse of the input voltage signal received at each of the resistive processing units of the array of resistive processing units, and
    wherein the input voltage signal is tuned during an update cycle in order to change a magnitude of a minimum update of conductance to control the learning rate.

2. The method according to claim 1,
    wherein the controlling of the amplitude of input voltage signal is according to a processor of a control device,
    wherein the controlling includes changing the learning rate of the array of resistive processing units by varying the amplitude of the input voltage signal to the array of resistive processing units, and
    wherein the conductance state includes a resistance.

3. The method according to claim 1, wherein a voltage pulse height is controlled to vary the learning rate of a training on a resistive processing unit hardware comprising at least a two dimensional array of the resistive processing units, and
    wherein the pulses of the input voltage signal are changed during an update cycle in accordance with the change of the magnitude of the minimum update of conductance of the RPUs to control the learning rate.

4. The method according to claim 1, wherein the array of resistive processing units is configured to implement a neural network, and
    wherein the amplitude of the pulses of the input voltage signal for larger learning rates are greater than the amplitude of the pulses of the input voltage signal for smaller learning rates while having a same time duration of the input voltage signal.

5. The method according to claim 1, wherein the array of resistive processing units form at least a two dimensional array.

6. The method according to claim 1, wherein the amplitude of a pulse of the input voltage signal is controlled for each node of the array of the resistive processing units.

7. The method according to claim 1, wherein each node of the array of resistive processing units comprises:
    a first terminal;
    a second terminal; and
    an active region including a conduction state;
    wherein the conduction state identifies a weight of a training methodology applied to the resistive processing unit,
    wherein the active region is configured to locally perform a data storage operation of the training methodology; and
    wherein the active region is further configured to locally perform a data processing operation of the training methodology.

8. The method according to claim 7, wherein the active region is further configured to locally perform the data storage operation of the training methodology according to at least in part on the variable amplitude of the input voltage signal; and
    the active region is further configured to locally perform the data processing operation of the training methodology based at least in part on the variable amplitude of the input voltage signal.

9. A device for controlling resistive processing units (RPUs), the device comprising:
    a computer readable storage medium storing program instructions; and
    a processor executing the program instructions, the processor configured to:
        apply an input voltage signal to each node of an array of resistive processing units (RPUs); and
        control a learning rate of the array of resistive processing units in accordance with a change in an amplitude of a pulse of the input voltage signal to each node of the array of resistive processing units,
    wherein a conductance state of the array of resistive processing units is varied according to the amplitude received at each of the resistive processing units of the array of resistive processing units, and
    wherein the input voltage signal is tuned during an update cycle in order to change a magnitude of a minimum update of conductance to control the learning rate.

10. The device according to claim 9, wherein a voltage pulse height is controlled to vary the learning rate of training on a resistive processing unit hardware comprising at least a two dimensional array of the resistive processing units.

11. A system including the device according to claim 9, further comprising the array of resistive processing units being configured to be implemented in a neural network.

12. The system according to claim 11, wherein the array of resistive processing units form at least a two dimensional array.

13. The system according to claim 11, wherein the amplitude of a pulse of the input voltage signal is controlled for each node of the array of the resistive processing units.

14. The system according to claim 11, wherein each node of the array of resistive processing units comprises:
   a first terminal;
   a second terminal; and
   an active region including a conduction state;
   wherein the conduction state identifies a weight of a training methodology applied to the resistive processing unit,
   wherein the active region is configured to locally perform a data storage operation of the training methodology; and
   wherein the active region is further configured to locally perform a data processing operation of the training methodology.

15. The system according to claim 14, wherein the active region is further configured to locally perform the data storage operation of the training methodology according to at least in part on the variable amplitude of the input voltage signal; and
   the active region is further configured to locally perform the data processing operation of the training methodology based at least in part on the variable amplitude of the input voltage signal.

16. A computer program product for controlling resistive processing units (RPUs), the computer program product comprising a computer readable storage medium having program instructions embodied therewith, the program instructions readable and executable by a computer to cause the computer to:
   send an input voltage signal to each node of an array of resistive processing units; and
   control and change a learning rate of the array of resistive processing units by varying an amplitude of a pulse of the input voltage signal to each node of the array of resistive processing units,
   wherein a conductance state of the array of resistive processing units is varied according to the amplitude received at each of the resistive processing units of the array of resistive processing units.

17. The computer program product according to claim 16, wherein the controlling of the amplitude of input voltage signal is according to a processor of a control device, and
   a voltage pulse height is controlled to vary the learning rate of training on a resistive processing unit hardware comprising at least a two dimensional array of the resistive processing units.

18. The computer program product according to claim 16, wherein the array of resistive processing units are configured to be implemented in a neural network,
   wherein the array of resistive processing units forms at least a two dimensional array, and
   wherein the amplitude of a pulse of the input voltage signal is controlled for each node of the array of the resistive processing units.

19. The computer program product according to claim 16, wherein each node of the array of resistive processing units being controlled comprises:
   a first terminal;
   a second terminal; and
   an active region including a conduction state;
   wherein the conduction state identifies a weight of a training methodology applied to the resistive processing unit,
   wherein the active region is configured to locally perform a data storage operation of the training methodology,
   wherein the active region is further configured to locally perform a data processing operation of the training methodology,
   wherein the active region is further configured to locally perform the data storage operation of the training methodology according to at least in part on the variable amplitude of the input voltage signal, and
   wherein the active region is further configured to locally perform the data processing operation of the training methodology based at least in part on the variable amplitude of the input voltage signal.

* * * * *